United States Patent
Kelley et al.

(10) Patent No.: US 6,636,244 B1
(45) Date of Patent: Oct. 21, 2003

(54) POINTING DEVICE SELECTION METHOD

(75) Inventors: Edward E. Kelley, Wappinger Falls, NY (US); Eric Michael Motika, Hopewell Junction, NY (US); Franco Motika, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/395,394

(22) Filed: Sep. 13, 1999

(51) Int. Cl.[7] .................................................. G09G 5/00
(52) U.S. Cl. ....................... 345/781; 345/788; 345/790; 345/793
(58) Field of Search ................................ 345/719, 720, 345/748, 763, 761, 768, 759, 769, 770, 771, 781, 780, 788, 790, 793, 794, 797, 798, 803, 810, 825, 856, 861, 863, 866

(56) References Cited

U.S. PATENT DOCUMENTS

| | | | | |
|---|---|---|---|---|
| 5,463,726 A | | 10/1995 | Price | 345/155 |
| 5,760,772 A | * | 6/1998 | Austin | 345/798 |
| 5,771,042 A | | 6/1998 | Santos-Gomez | 345/342 |
| 5,812,862 A | * | 9/1998 | Smith et al. | 345/781 |
| 5,818,451 A | | 10/1998 | Bertram et al. | 345/354 |
| 5,841,435 A | | 11/1998 | Dauerer et al. | 345/339 |
| 5,867,163 A | * | 2/1999 | Kurtenbach | 345/840 |
| 5,886,697 A | | 3/1999 | Naughton et al. | 345/348 |
| 5,956,027 A | * | 9/1999 | Krishnamurthy | 345/760 |
| 5,995,102 A | * | 11/1999 | Rosen et al. | 345/856 |
| 6,008,809 A | * | 12/1999 | Brooks | 345/792 |
| 6,020,884 A | * | 2/2000 | MacNaughton et al. | 345/747 |
| 6,088,712 A | * | 7/2000 | Huang et al. | 707/526 |
| 6,226,652 B1 | * | 5/2001 | Percival et al. | 707/203 |
| 6,278,455 B1 | * | 8/2001 | Baker | 345/716 |
| 6,313,854 B1 | * | 11/2001 | Gibson | 345/788 |
| 6,333,752 B1 | * | 12/2001 | Hasegawa et al. | 345/764 |
| 6,335,742 B1 | * | 1/2002 | Takemoto | 345/781 |
| 6,351,599 B1 | * | 2/2002 | Komeno | 386/70 |
| 6,429,880 B2 | * | 8/2002 | Marcos et al. | 345/744 |
| 6,452,609 B1 | * | 9/2002 | Katinsky et al. | 345/716 |

OTHER PUBLICATIONS

Visual Basic 5.0 Introduction, Student Manual, Ziff Education, (c)1997.*

* cited by examiner

*Primary Examiner*—Kristine Kincaid
*Assistant Examiner*—Thomas J Joseph
(74) *Attorney, Agent, or Firm*—James J. Cioffi (57) ABSTRACT

A method and computer program capable of providing a plurality of activation areas in a display, the display having a plurality of selectable objects surrounded by an object area which defines the boundaries of the selectable objects which must be contacted by a pointing device for selection. The activation areas surround the selectable objects and expand the boundary of the selectable objects which must be contacted by the pointing device for selection. The size of the activation areas is determined by an expansion boundary having a border that outlines the size and shape of the activation areas and enlarges the activation areas to a maximum size without overlapping.

9 Claims, 7 Drawing Sheets

POINTING DEVICE SELECTION METHOD

FIELD OF THE INVENTION

The present invention relates generally to a user interface for computers. More particularly, the present invention relates to a graphical user interface that allows a user to effectively select an object in a display.

BACKGROUND OF THE INVENTION

Increases in processing capability and decreases in the cost of personal computers has led to the proliferation of personal computers in all aspects of society. Personal computers are utilized in schools, homes and in business. Furthermore, with the decreased costs of personal computers, it has become more feasible from a cost perspective to use computers for tasks, and to carry out functions, which were previously done without the use of computers.

With the proliferation of computers throughout numerous aspects of life has come a trend to use graphical user interfaces which make using a computer more intuitive. A graphical user interface is a computer program designed to allow a computer user to more readily interact with a computer. Graphical user interfaces may be implemented in operating systems such as IBM OS/2® , Apple® Macintosh®, and Microsoft Windows®. Graphical user interfaces may also be implemented in applications such as word processing programs, database programs, spreadsheet programs, and Internet web browser programs.

Typically, graphical user interfaces employ the use of a pointing device and a display upon which objects are displayed. The display may be a cathode ray tube, an LCD screen, or any other means for allowing the user to see the graphical user interface. The pointing device may be a mouse, a trackball, a graphics tablet or any other device that may be used to move a mouse pointer across a display. Graphical user interfaces represent information to the user or commands to the computer by placing objects in the display. For example, an icon in the shape of a printer may represent a command to the computer to print a document. Another object in the form of a text line may provide the user with information.

Objects which represent a command to the computer can be selected by the user. These objects are often referred to as selectable objects. Objects which just provide information to the user are referred to as non-selectable objects. Graphical user interfaces rely on selectable objects to perform functions for the user. Selectable objects may be used to link one document to another, to open programs, or to move files. Any command given to a computer by a user may be performed by selecting a selectable object. Selectable objects have an area which surrounds them called the object area. The object area defines the boundaries of the selectable object.

Typically, a graphical user interface based application or operating system consists of many selectable objects. These objects may range from simple text lines, selection buttons, menu items, image maps, bullets, thumbnail images, icons, and several other special or customized objects. Often these selectable objects are also referred to as "clickable" objects or "hot" text and are usually displayed in a contrasting color to easily distinguish them from non-selectable objects.

The general selection process for selecting a selectable object consists of moving the mouse pointer over the object area of the selectable object, identifying the selection, and then clicking a select button on the pointing device to complete the selection. Moving the mouse pointer over the object area can be a rather difficult task for the user, since many pointing devices, such as a mouse or a trackball, are at times difficult to manipulate. Many users do not have the eye-hand coordination required to move a mouse pointer over an object area within a reasonable amount of time. Once the mouse pointer is over the object area, identifying the selection is usually accomplished by one of several methods such as highlighting the object, popping-up a text vignette, or even causing the selectable object or the selectable object's surrounding area to blink repeatedly. In an Internet web browser program, for example, the selection may be identified by displaying the hypertext linking address associated with a selectable object in the display. Once the selection of the selectable object is complete, some of the selectable object's attributes can be changed to confirm the selection. For example, in the case where a selectable object is represented by a graphical image, the graphical image may be changed to confirm the selectable object's selection.

Often times the object area of the selectable object is small. In this case, selecting the selectable object becomes even more difficult since the user must carefully manipulate the mouse pointer over the small object area in order to complete the selection. As a result of small object areas, the user must slow down the movement of the mouse pointer so that the user can carefully position the mouse pointer within the object area. Slowing down the movement of the mouse pointer requires the user to spend additional time and patience in order to select a selectable object. This creates a problem since often times users are short on time and patience and need to immediately select a selectable object in a display.

It is apparent from conventional graphical user interfaces that there is a need for a graphical user interface which allows the selection of an object in a display with less difficulty; which allows the user to more quickly select an object in a display; and which allows the selection of an object in a display having a small object area without having the user slow the mouse.

OBJECTS AND SUMMARY OF THE INVENTION

In view of the above limitations of existing graphical user interfaces, it is an object of the present invention to provide a graphical user interface which allows the selection of an object in a display with less difficulty.

It is a further object of the present invention to provide a graphical user interface which allows the user to more quickly select an object in a display.

It is yet another object of the present invention to provide a graphical user interface which allows the selection of an object in a display having a small object area without having the user slow the mouse.

The above and other objects of the present invention are provided by methods, data processing systems or program products which provide a graphical user interface that provides an activation area which surrounds a selectable object in a display. The activation area is greater than an object area that defines the selectable object. The activation area extends the boundaries of the selectable object so that a user can select the selectable object by placing a mouse pointer over the activation area, instead of just the object area, and pressing a select button on a mouse. The size of the activation area is determined in accordance with the properties of the selectable object and the display. The activation area should be larger than the object area, but should not exceed the size of the display.

The activation area is defined by an expansion boundary, which is a border that outlines the size and shape of the activation area. In one preferred embodiment of this invention the activation area takes on a rectangular shape wherein the expansion boundary comprises horizontal expansion lines and vertical expansion lines that circumscribe the periphery of the activation area.

In one preferred embodiment of this invention, a selection operation is performed in the activation area to select a selectable object. In one preferred embodiment of this invention, performing the selection operation on the selectable object changes the appearance of the selectable object. In another preferred embodiment of this invention, the placement of the mouse pointer over the activation area changes the appearance of the selectable object.

In one preferred embodiment of this invention, the activation area is enlarged to a maximum activation area, which is the maximum area that the activation area can occupy. In one preferred embodiment of this invention, the maximum activation area is created by enlarging the horizontal expansion lines until vertical expansion lines abut the edge of the display, the application border, or another vertical expansion line. The vertical expansion lines are then enlarged until the horizontal expansion lines abut the edge of the display, the application border, a title bar, a menu bar, or another horizontal expansion line.

In one preferred embodiment of this invention, the maximum activation area can be set manually by the user. In another preferred embodiment of this invention, the maximum activation area can determined automatically by using an expansion program. In one preferred embodiment of this invention, the user may select an expansion program from a list of alternate expansion programs, depending on how the user would like to expand the activation area.

The activation area has many characteristics that define the appearance of the activation area in display, which include for example size, shape, color, style, style of the expansion boundary, and the color of the expansion boundary. In one preferred embodiment of this invention, the characteristics which define the activation area can be changed. The characteristics can be manually changed by the user, or any individual.

In one preferred embodiment of this invention, the display comprises a plurality of activation areas that surround a plurality of selectable objects. In one preferred embodiment of this invention, the activation areas are enlarged to maximum activation areas without overlapping any one activation area with any other activation area.

As will be appreciated by those of skill in this art, the above described aspects of the present invention may also be provided as apparatus or computer program products and is particularly well suited to program tools, applications, or operating systems which utilize a graphical user interface.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system or program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable storage medium may be utilized including hard disks, CD-ROMs, DVD-ROMs, optical storage devices, or magnetic storage devices.

Figure 1:
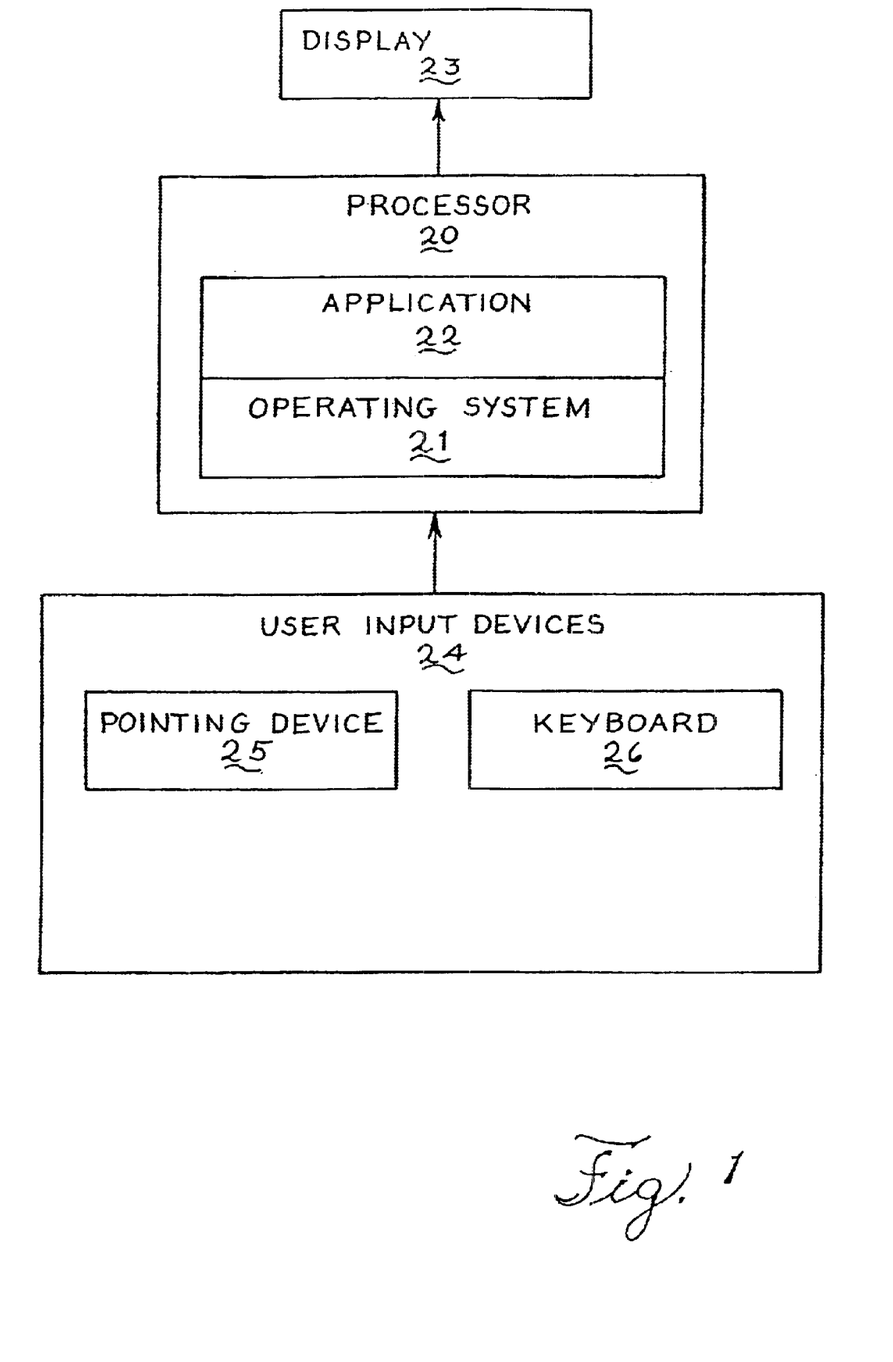
FIG. 1 is a block diagram of a system utilizing the present invention.

FIG. 1 illustrates a data processing system on which a graphical user interface according to the present invention may be utilized. As seen in FIG. 1, processor 20 may have operating system 21 resident in processor 20. Application 22 may be running on operating system 21. Processor 20 displays information on display 23. Display 23 has a plurality of picture elements (collectively referred to as a screen) which may define the appearance of the graphical user interface displayed on display 23. Display 23 may be a cathode ray tube, a LCD screen, or any other means for allowing a user to see the graphical user interface. The contents of display 23 and, therefore, the appearance of the graphical user interface, may be controlled or altered by application 22 or operating system 21 either individually or in combination.

Figure 2:
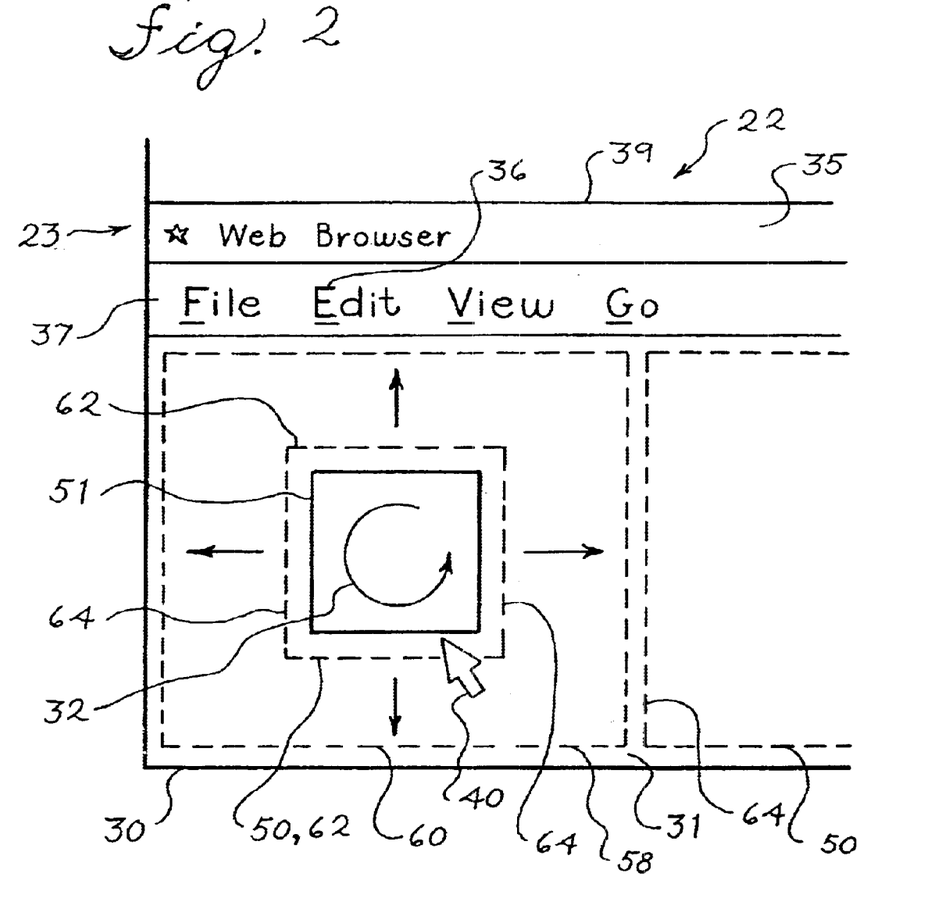
FIG. 2 is a diagram of a graphical user interface having a selectable object in a display according to one preferred embodiment of this invention.

For obtaining input from a user, operating system 21, application 22 or both may utilize user input devices 24. User input devices 24 may be used to designate areas of the screen by performing a pointing operation on those areas. For example, user input devices 24 may be used to designate selectable object 32 in display 23, as illustrated in FIG. 2. Furthermore, once designated, the graphical user interface may display a separate icon to indicate that selection of selectable object 32 may issue a command to processor 20. Alternatively, the graphical user interface may display a menu to indicate that certain characteristics of selectable object 32 may be changed.

Figure 3:
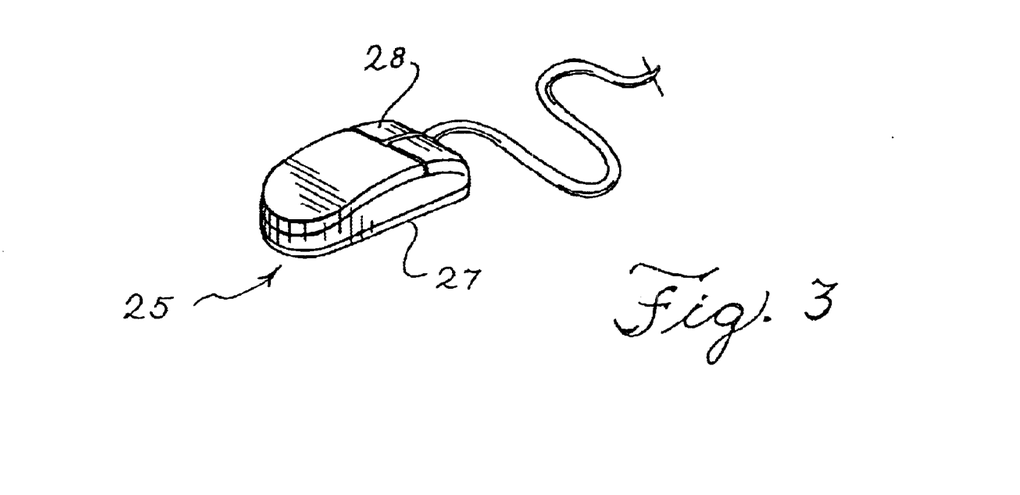
FIG. 3 is an illustration of a pointing device according to one preferred embodiment of this invention.

User input devices 24 may include pointing device 25, keyboard 26, or any other input devices known to those of skill in the art. Pointing device 25 may include mouse 27, a trackball, a touch pad, a graphics tablet, or other pointing devices known to those skilled in the art. Pointing device 25 allows a user to move mouse pointer 40 located in display 23 over an object located in display 23, as illustrated in FIG. 2. Pointing device 25 comprises select button 28, as illustrated in FIG. 3. By pressing select button 28, the user can select selectable object 32 in display 23 when mouse pointer 40 is over the boundaries of selectable object 32. The operation of selecting selectable object 32 as used throughout this specification and claims will be referred to as a selection operation, unless otherwise noted.

Figure 5:
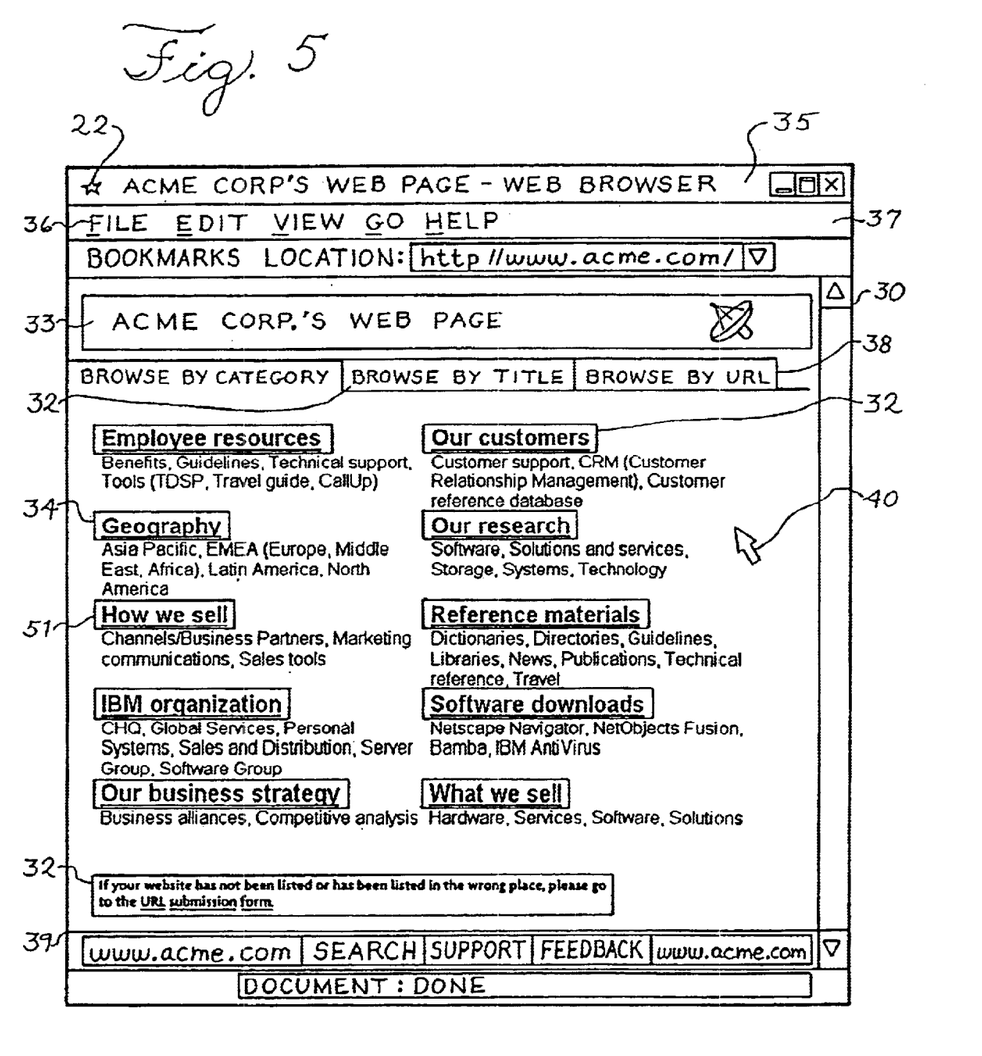
FIG. 5 is a diagram of a graphical user interface having multiple objects in a display according to one preferred embodiment of this invention.

A graphical user interface according to the present invention may be implemented in application 22, operating system 21, or both application 22 and operating system 21. The graphical user interface employs the use of user input device 24, such as pointing device 25, and display 23 upon which the graphical user interface may be displayed. The graphical user interface represents information or commands in display 23 by using selectable objects 32 and non-selectable objects 33, as illustrated in FIG. 5. Selectable objects 32 typically represent commands to the computer and can be selected by the user. Non-selectable objects 33 typically provide information and cannot be selected by the user.

FIG. 2 illustrates one preferred embodiment of the present invention. As seen in FIG. 2 application 22 is displayed within display 23. Application 22 has title bar 35, menu bar 37, menu items 36, and selectable object 32 all displayed within display 23. Display 23 presents a graphical user interface and may be considered, for example, a desktop. Display 23 is defined by display edge 30 which circumscribes the periphery of display 23. Application 22 is defined by a resizable application border 39 which circumscribes the periphery of application 22. Title bar 35 displays the title of application 22 running in display 23, while menu bar 37 displays menu items 36 that the user may select, with a user input device 24, when using application 22. Application 22 may be running a word processing document, a spreadsheet document, an HTML document, a graphics document, a presentation document, or any other document which can be displayed within display 23.

Selectable object 32 is located within application 22, as illustrated in FIG. 2. While in this embodiment selectable object 32 is located within application 22, as will be appreciated by those of skill in the art, selectable object 32 may also be located within operating system 21 or any other computer program which utilizes a graphical user interface. In one preferred embodiment of this invention selectable object 32 is a selection button 38, as illustrated in FIG. 5. Selectable object 32 may also be text line 34, menu item 36, an image map, a bullet, a thumbnail image, an icon, and several other special or customized objects. Selectable object 32 may be used to link one document to another, to open programs, to move files, or perform any command given to a computer by a user. Object area 51 surrounds selectable object 32 and defines the boundaries of selectable object 32 over which mouse pointer 40 can select selectable object 32.

Figure 6:
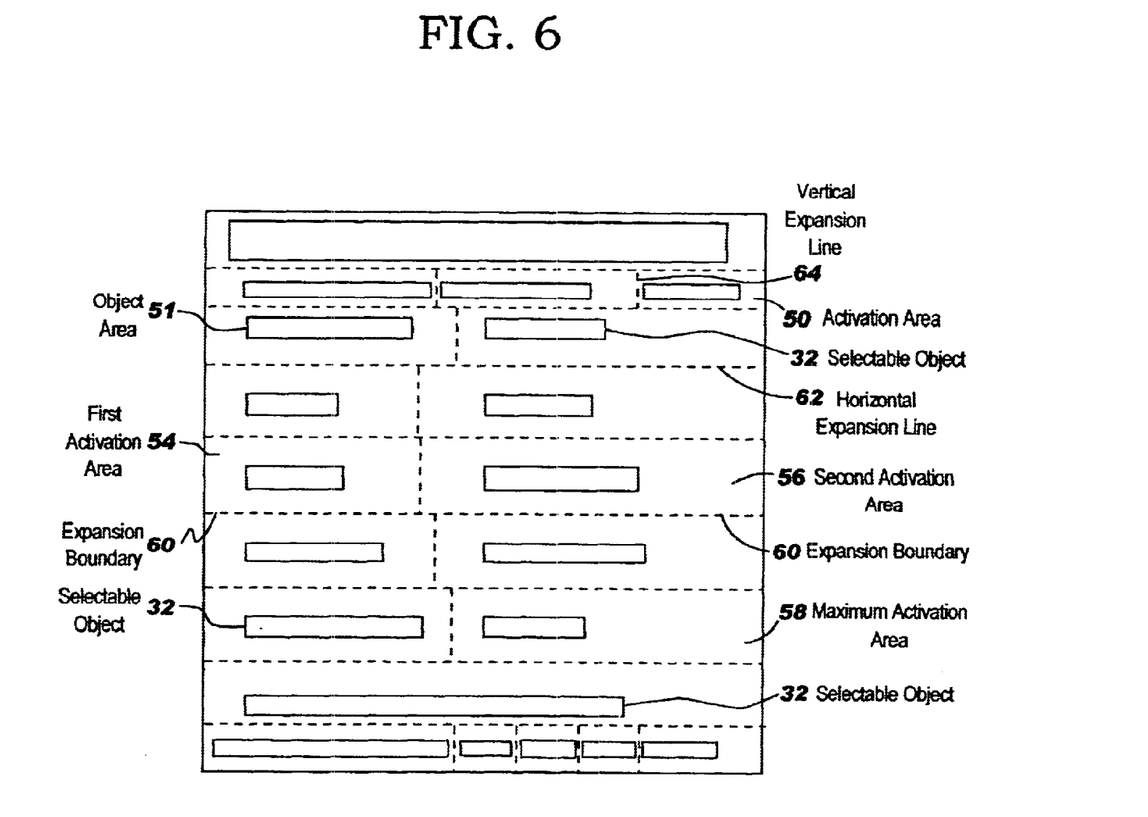
FIG. 6 is a diagram of the activation areas surrounding the objects shown in FIG. 5.

As illustrated in FIG. 2, activation area 50 is provided in display 23. Activation area 50 surrounds selectable object 32 and is greater than object area 51 of selectable object 32. Activation area 50 extends the boundaries of selectable object 32. A user can perform a selection operation on selectable object 32 by placing mouse pointer 40 over activation area 50 and pressing select button 28 instead of just placing mouse pointer 40 over object area 51 and pressing select button 28. The size of activation area 50 is determined in accordance with the properties of selectable object 32 and display 23. Activation area 50 should be larger than object area 51, but should not exceed the size of display 23. Activation area 50 can take on any shape, such as a circle, an ellipse, a square, a rectangle, or any other form which can surround selectable object 32. Activation area 50 is defined by expansion boundary 60, as illustrated in FIG. 2 and FIG. 6. Expansion boundary 60 is a border that outlines the size and shape of activation area 50. In one preferred embodiment of this invention activation area 50 takes on a rectangular shape defined by expansion boundary 60. Expansion boundary 60 comprises horizontal expansion lines 62 and vertical expansion lines 64 that circumscribe the periphery of activation area 50.

In one preferred embodiment of this invention, a selection operation is performed in activation area 50 to select selectable object 32. By allowing a selection operation to be performed in activation area 50 instead of just in object area 51, the selection operation is made easier since the boundaries of selectable object 32 have been extended to include activation area 50 as well as object area 51.

In one preferred embodiment of this invention, performing a selection operation on selectable object 32 changes the appearance of selectable object 32. The appearance of selectable object 32 includes the size, color, shape, design, and other physical characteristics of selectable object 32. For example, in this preferred embodiment, if a selection operation is performed on selectable object 32, the color of selectable object 32 may change from black to red.

In one preferred embodiment of this invention, the placement of mouse pointer 40 over activation area 50 changes the appearance of selectable object 32. The operation of placing mouse pointer 40 over activation area 50 or object area 51, and causing the appearance of selectable object to change or causing a response to appear in display 23, as used throughout this specification and claims will be referred to as identifying the selectable object, unless otherwise noted. In one preferred embodiment of this invention, identifying the selectable object is accomplished by highlighting selectable object 32. Identifying the selectable object may also be accomplished by popping-up a text vignette, or even causing selectable object 32 or the area surrounding selectable object 32 to blink repeatedly. In one preferred embodiment of this invention, identifying the selectable object is accomplished by displaying a hypertext linking address associated with selectable object 32 in display 23.

In one preferred embodiment of this invention, activation area 50 is enlarged to maximum activation area 58, as illustrated in FIG. 2. Maximum activation area 58 is the maximum area that activation area 50 can occupy within application 22 and within display 23. In one preferred embodiment of this invention, maximum activation area 58 is created by enlarging horizontal expansion lines 62 and vertical expansion lines 64. Horizontal expansion lines 62 are enlarged until vertical expansion lines 64 abut display edge 30, application border 39, or another vertical expansion line 64. Vertical expansion lines 64 are enlarged until horizontal expansion lines 62 abut display edge 30, application border 39, title bar 35, menu bar 37, or another horizontal expansion line 62.

In one preferred embodiment of this invention, maximum activation area 58 can be set manually by the user. The user can utilize pointing device 25 to drag mouse pointer 40 and create activation area 50 around selectable object 32. The size of activation area 50 is then manually adjusted by the user until activation area 50 becomes maximum activation area 58. In one preferred embodiment of this invention, maximum activation area 58 can determined automatically by using an expansion program. An expansion program, is a computer program that is has a set number of pre-programmed parameters, such as the location of display edge 30, the location of application border 39, and the size of activation area 50. The expansion program then determines the size and location of maximum activation area 58 by using these pre-programmed parameters and a set of pre-programmed rules. In one preferred embodiment of this invention, the user may select an expansion program from a list of alternate expansion programs, depending on how the user would like to expand activation area 50.

Activation area 50 has many characteristics that define the appearance of activation area 50 in display 23. The characteristics of activation area 50 include for example size, shape, color, style, style of expansion boundary 60, and color of expansion boundary 60. For example the style of expansion boundary 60 can be a dashed line or a solid line, and the style of activation area 50 can be a solid box, a shaded box, or any other style which can designate the location of activation area 50. Activation area 50 can also vary in color, or it can be invisible. In one preferred embodiment of this invention activation area 50 is invisible. In one preferred embodiment of this invention, the characteristics which define activation area 50 can be changed. The characteristics can be manually changed by the user, or any individual. For example, menu bar 37 may contain menu item 36 which, after being selected, can cause a menu to pop-up and offer a series of selections which allow the user, or any individual, to change the characteristics of activation area 50.

Figure 4:
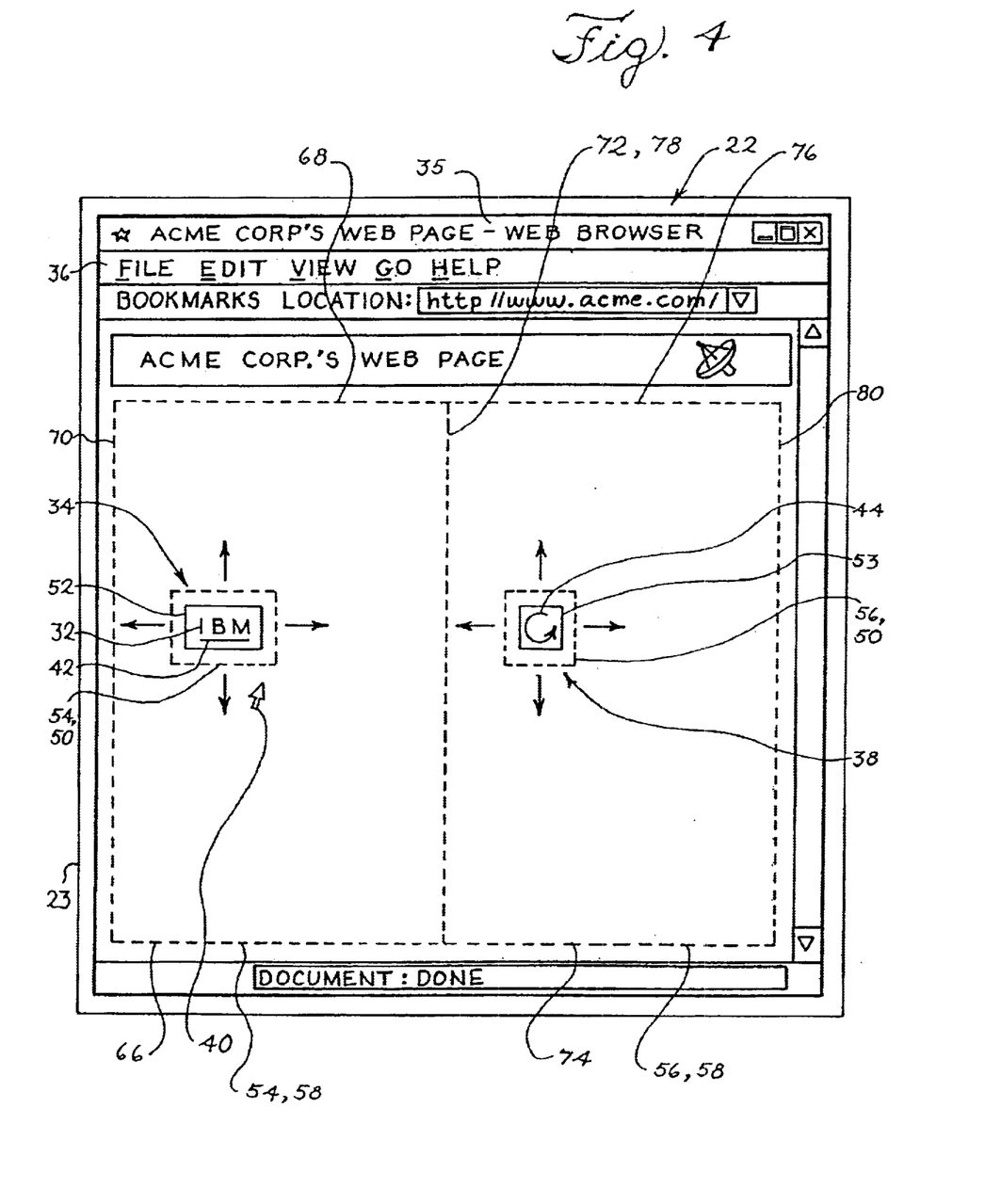
FIG. 4 is a diagram of a graphical user interface having a first object and a second object in a display according to one preferred embodiment of this invention.

In one preferred embodiment of this invention, display 23 comprises a plurality of activation areas 50, such as first activation area 54 and second activation area 56, as illustrated in FIG. 4 and FIG. 6. The plurality of activation areas 50 surround a plurality of selectable objects 32, such as first object 42 and second object 44. In one preferred embodiment of this invention, activation areas 50 are enlarged to maximum activation areas 58 without overlapping any one activation area 50 with any other activation area 50, as illustrated in FIG. 6.

In one preferred embodiment of this invention, first activation area 54 is provided for first object 42 in display 23, and second activation area 56 is provided for second object 44 in display 23, as illustrated in FIG. 4. First activation area 54 and second activation area 56 share all the properties and attributes of activation area 50, as described above. First object 42 and second object 44 share all the properties and attributes of selectable object 32, as described above. First object 42 has first object area 52 and second object 44 has second object area 53. First object area 52 surrounds first object 42 and defines the boundaries of first object 42 over which mouse pointer 40 can select first object 42. Second object area 53 surrounds second object 44 and defines the boundaries of second object 44 over which mouse pointer 40 can select second object 44. First activation area 54 is enlarged to maximum activation area 58 without overlapping second activation area 56. Second activation area 56 is enlarged to maximum activation area 58 without overlapping first activation area 54. Maximum activation areas 58 are the maximum areas that first activation area 54 and second activation area 56 can occupy within application 22 and within display 23, without overlapping each other.

A selection operation can be performed in first activation area 54 to select first object 42. Alternatively, a selection operation can be performed in second activation area 56 to select second object 44. By allowing a selection operation to be performed in first activation area 54 instead of just in first object area 52, or in second activation area 56 instead of just second object area 53, the selection operation is made easier since the boundaries of first object 42 and second object 44 have been extended.

In one preferred embodiment of this invention, maximum activation area 58 of first object 42 and second object 44 can set manually by the user. The user can use pointing device 25 to drag mouse pointer 40 and create activation areas 50 around first object 42 and second object 44. The sizes of activation areas 50 are then manually adjusted by the user until activation areas 50 become maximum activation areas 58. In one preferred embodiment of this invention, maximum activation areas 58 can be determined automatically by using an expansion program, as described above.

In one preferred embodiment of this invention, first activation area 54 is defined by first horizontal expansion line 66, second horizontal expansion line 68, first vertical expansion line 70, and second vertical expansion line 72, as illustrated in FIG. 4. Second activation area is defined by third horizontal expansion line 74, fourth horizontal expansion line 76, third vertical expansion line 78, and fourth vertical expansion line 80, as illustrated in FIG. 4. An expansion program then expands first activation area 54 and second activation area 56 to maximum activation areas 58 by extending the length of first horizontal expansion line 66, second horizontal expansion line 68, third horizontal expansion line 74, fourth horizontal expansion line 76, first vertical expansion line 64, second vertical expansion line 72, third vertical expansion line 78, and fourth vertical expansion line 80 within the display 23.

While the above use of activation areas 50 and selectable objects 32 has been described with respect to applications 22 in general, as will be appreciated by those of skill in the art, the same use of activation areas 50 and selectable objects 32 may be readily accomplished with operating systems 21 or other computer programs which utilize a graphical user interface.

As will be appreciated by those of skill in this art, the preceding examples are provided, not to limit or define the scope of the present invention, but to illustrate the nature of the present invention and possible uses for the teachings of the present invention. These examples may be modified in many different ways while still obtaining the benefits of the teachings of the present invention. For example, the present examples have been illustrated with respect one or two activation areas 50 and one or two selectable objects 32. However, the present invention should not be construed as limited in that the use of activation area 50 to selectable object 32 of the present invention applies equally to any number of activation areas 50 and any number of selectable objects 32 within display 23. Accordingly, as used herein the term application may refer to a window-like workspace on a desktop as described above or may refer to a resizable subdivision of a workspace. In such a case, application 22 may be considered a "workspace" and applications 22 described herein may be considered subdivisions of the workspace.

Figure 7:
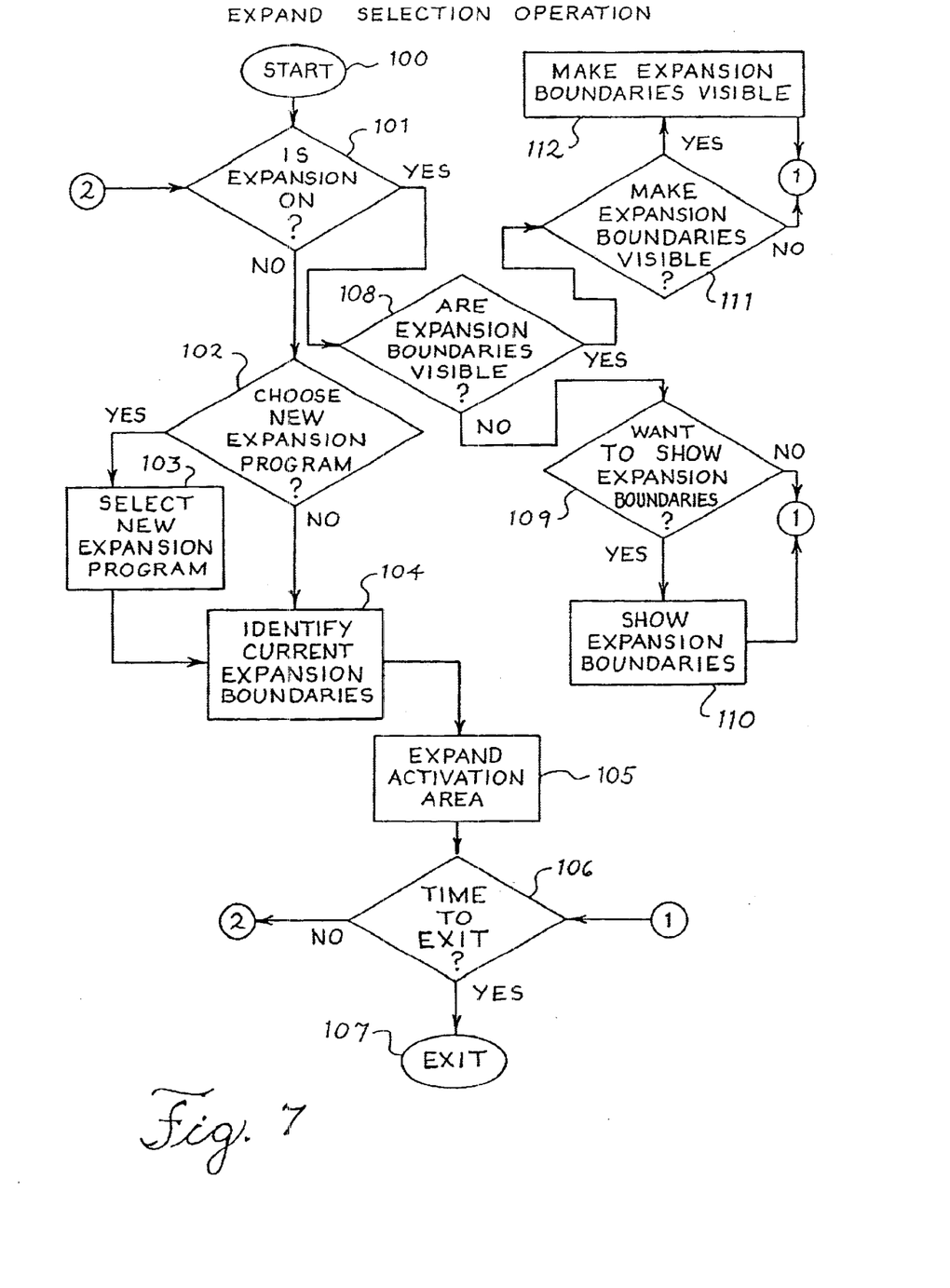
FIG. 7 is a flow chart of the expand selection operation of the present invention.

FIGS. 6–7 are flowchart illustrations of methods, apparatus (systems) and computer program products according to the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

As seen in FIG. 7 an expand selection operation is initiated in block 100. The expand selection operation identifies expansion boundaries 60 of activation areas 50, and then expands expansion boundaries 60 to maximum activation areas 58. The expand selection operation also controls the certain characteristics of expansion boundaries 60, such as whether expansion boundaries 60 are visible or not.

The expand selection operation first determines if the expansion program which expands activation areas 50 is on, as seen in block 101. If activation areas 50 have been expanded to maximum activation areas 58, then the expansion program is on and the expand selection operation moves to block 108. Block 108 determines whether expansion boundaries 60 are visible or not. If expansion boundaries 60 are visible, then the expand selection operation gives the user the option to make expansion boundaries 60 invisible, as illustrated in blocks 111 and 112. If expansion boundaries 60 are not visible, then the expand selection operation gives the user the option to make expansion boundaries 60 visible, as illustrated in blocks 109 and 110.

If the expansion program is not on, then the expand selection operation moves to block 102. Block 102 asks the user, or has processor 20 calculate, whether a different expansion program needs to be chosen to expand activation areas 50. If a different expansion program needs to be chosen, then the expand selection operation moves to block 103 and asks the user to choose, or has processor 20 choose, a new expansion program. Once the expand selection operation determines which expansion program to use, the expand selection operation moves to block 104. Block 104 identifies the current expansion boundaries 60 present in display 23. Once all expansion boundaries 60 are identified, the expand selection operation expands activation areas 50 to maximum activation areas 58, as illustrated in block 105. Block 106 asks the user, or processor 20, whether it is time to exit to block 107 and end the expand selection operation. As will be appreciated by those of skill in the art, any of the conditions described above for expanding activation areas 50 to maximum activation areas 58, and making expansion boundaries 60 invisible or visible, may be implement utilizing these operations.

Figure 8:
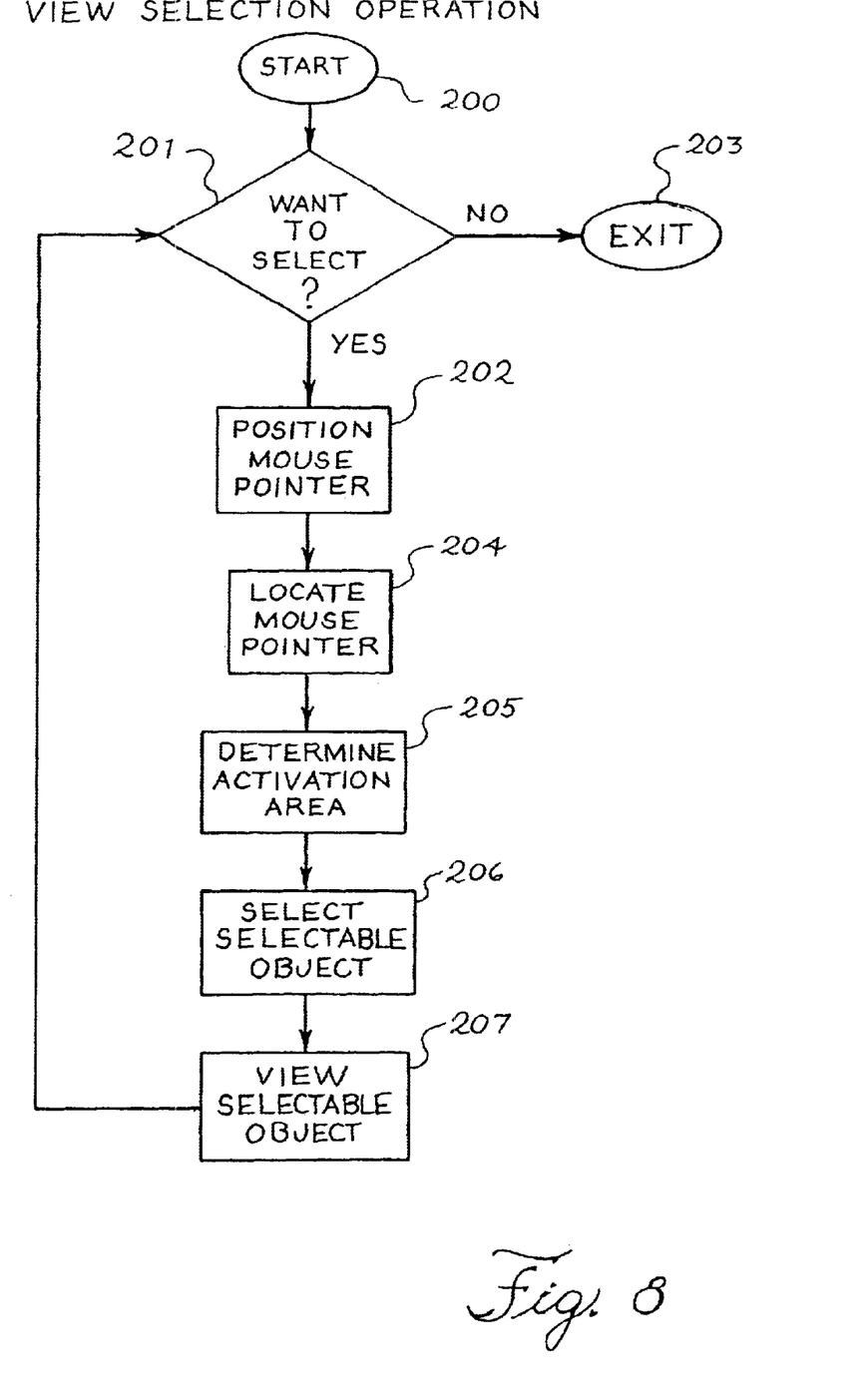
FIG. 8 is a flow chart of the view selection operation of the present invention.

As seen in FIG. 8 a view selection operation is initiated in block 200. The view selection operation determines whether the user would like to select selectable object 32, and if so, details the procedure of selecting selectable object 32. The view selection operation begins by first determining whether the user would like to select selectable object 32, as seen in block 201. If the user would like to select selectable object 32, the view selection operation them move to block 202. If the user would not like to select selectable object 32, then the view selection operation ends, by exiting to block 203. Block 202 requires the user to position mouse pointer 40 in activation area 50. Once the user has positioned mouse pointer 40, the view selection operation then requires the user to locate the position of mouse pointer 40 in display 23, as illustrated in block 204. The view selection operation then determines which activation area 50 has been selected by the user, as illustrated in block 205. At this point, the view selection operation can change the appearance of selectable object 32 or cause a response to appear in display 23 to indicate that selectable object 32 has been selected by the user. The user then clicks select button 28 in order to select selectable object 32, as illustrated in block 206. Once selectable object 32 has been selected, the view selection operation allows the user to view the results of selecting selectable object 32, as illustrated in block 207. The user then has the option of selecting another selectable object 32 or exiting the view selection operation, as illustrated in FIG. 8. As will be appreciated by those of skill in the art, any of the conditions described above for selecting selectable object 32, may be implement utilizing these operations.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. A method for selecting a selectable object defined by an object area in a display with a pointing device, the method comprising the steps of:

providing a plurality of selectable objects in a display, said selectable objects surrounded by an object area which defines the boundaries of said selectable objects which must be contacted by said pointing device for selection;

providing a plurality of activation areas in the display, the activation areas surrounding the selectable objects in the display and being greater than the object area, said activation areas expanding the boundary of said selectable objects which must be contacted by said pointing device for selection;

providing an expansion boundary, said expansion boundary having a border that outlines the size and shape of the activation areas, said border determined in accordance with properties of the selectable objects and of the display; and enlarging the plurality of activation areas to maximum activation areas without overlapping any one activation area with any other activation area.

2. A method according to claim 1 further comprising the step of performing a selection operation in the activation areas to select the selectable objects.

3. A method according to claim 2, wherein the selection operation changes the appearance of the selectable objects.

4. A method according to claim 1, wherein the placement of a mouse pointer over the activation areas changes the appearance of the selectable objects.

5. A method according to claim 1, wherein characteristics of the activation areas are defined by user input.

6. A computer program for selecting a plurality of selectable objects defined by an object area in a display with a pointing device, the computer program comprising:

a storage medium;

activation code on the storage medium for providing a plurality of activation areas for a plurality of selectable objects in the display, the selectable objects surrounded by an object area which defines the boundaries of said selectable objects which must be contacted by said pointing device for selection, the activation areas surrounding the selectable objects in the display and being greater than the object area, said activation areas expanding the boundary of said selectable objects which must be contacted by said pointing device for selection, the size of the activation areas determined by an expansion boundary having a border that outlines the size and shape of said activation areas in accordance with properties of the selectable object and of the display, and said activation areas enlarged to maximum activation areas without overlapping any one activation area with any other activation area.

7. A computer program according to claim 6, further comprising expansion code on the storage medium to maximize the size of the activation areas within the display.

8. A computer program according to claim 6, further comprising selection code on the storage medium responsive to user input and the activation code, for performing a selection operation in the activation areas to select the selectable objects.

9. A computer program according to claim 6, further comprising change code on the storage medium for changing the characteristics of the activation areas.

* * * * *